(12) United States Patent
Grossman

(10) Patent No.: US 10,119,842 B1
(45) Date of Patent: Nov. 6, 2018

(54) ENCODER DESIGN AND USE

(71) Applicant: X Development LLC, Mountain View, CA (US)

(72) Inventor: John Henry Grossman, Fremont, CA (US)

(73) Assignee: X Development LLC, Mountain View, CA (US)

( * ) Notice: Subject to any disclaimer, the term of this patent is extended or adjusted under 35 U.S.C. 154(b) by 866 days.

(21) Appl. No.: 14/451,993

(22) Filed: Aug. 5, 2014

(51) Int. Cl.
*G01D 5/26* (2006.01)
*G01D 5/347* (2006.01)

(52) U.S. Cl.
CPC ............ *G01D 5/264* (2013.01); *G01D 5/3473* (2013.01); *G01D 5/34746* (2013.01)

(58) Field of Classification Search
CPC ... G01D 5/264; G01D 5/3473; G01D 5/34746
See application file for complete search history.

(56) References Cited

U.S. PATENT DOCUMENTS

| | | | |
|---|---|---|---|
| 4,079,251 A | 3/1978 | Osann, Jr. | |
| 4,183,014 A * | 1/1980 | McClean | H03M 1/30 250/231.18 |
| 4,672,279 A | 6/1987 | Hosokawa et al. | |
| 4,914,437 A | 4/1990 | Kibrick et al. | |
| 4,920,259 A | 4/1990 | Epstein | |
| 4,922,176 A | 5/1990 | Kim | |
| 5,285,433 A * | 2/1994 | Oshiba | G11B 7/0033 235/476 |
| 5,336,884 A * | 8/1994 | Khoshnevisan | G01D 5/2497 250/231.14 |
| 5,416,652 A * | 5/1995 | Lewis | G11B 5/59655 360/48 |
| 5,430,373 A * | 7/1995 | Ichikawa | G01D 5/2497 324/207.21 |
| 5,917,182 A * | 6/1999 | Ishizuka | G01D 5/38 250/237 G |
| 5,929,789 A | 7/1999 | Barbehenn | |

(Continued)

FOREIGN PATENT DOCUMENTS

EP 361867 A2 4/1990
WO 1997040345 A1 10/1997

OTHER PUBLICATIONS

Cho, WO2013172564, Nov. 21, 2013, WIPO.*

*Primary Examiner* — Stephanie E Bloss
*Assistant Examiner* — Lisa E Peters
(74) *Attorney, Agent, or Firm* — McDonnell Boehnen Hulbert & Berghoff LLP

(57) ABSTRACT

A shaft may be rotated, where the shaft includes an encoder with a first, second, and third logical track, where the first and second logical tracks include bit patterns that are readable to be 90 degrees out of phase with one another, and where the third logical track includes a sequence of n numbers, each number being represented by m bits, where n is greater than 1. While moving the shaft, a number of the sequence from the third logical track and an extent of bits from the first or second logical track may be read. An orientation of the shaft may then be determined based on the number and the extent of bits. The orientation may be a linear position of a linear encoder or an angular position of a rotary encoder.

26 Claims, 9 Drawing Sheets

```
┌─────────────────────────────────────────────────┐
│ MOVE A SHAFT, WHERE THE SHAFT INCLUDES AN       │
│ ENCODER WITH A FIRST LOGICAL TRACK, A SECOND    │
│ LOGICAL TRACK, AND A THIRD LOGICAL TRACK,       │  400
│ WHERE THE FIRST LOGICAL TRACK AND THE SECOND    │
│ LOGICAL TRACK COMPRISE BIT PATTERNS THAT ARE    │
│ READABLE TO BE 90 DEGREES OUT OF PHASE WITH ONE │
│ ANOTHER, AND WHERE THE THIRD LOGICAL TRACK      │
│ INCLUDES A SEQUENCE OF N NUMBERS, EACH NUMBER   │
│ IN THE SEQUENCE REPRESENTED BY M BITS, WHERE N  │
│ IS GREATER THAN 1                               │
└─────────────────────────────────────────────────┘
                        │
                        ▼
┌─────────────────────────────────────────────────┐
│ WHILE MOVING THE SHAFT, READ A NUMBER OF THE    │  402
│ SEQUENCE FROM THE THIRD LOGICAL TRACK AND READ  │
│ AN EXTENT OF BITS FROM THE FIRST OR SECOND      │
│ LOGICAL TRACK                                   │
└─────────────────────────────────────────────────┘
                        │
                        ▼
┌─────────────────────────────────────────────────┐
│ DETERMINE AN APPROXIMATE ORIENTATION OF THE     │  404
│ SHAFT BASED ON THE FIRST NUMBER AND THE EXTENT  │
│ OF BITS                                         │
└─────────────────────────────────────────────────┘
```

(56) References Cited

U.S. PATENT DOCUMENTS

| | | | |
|---|---|---|---|
| 6,963,063 B2 * | 11/2005 | Johnson | G01D 5/2451 250/231.13 |
| 7,012,677 B2 | 3/2006 | Mutschler | |
| 7,022,975 B2 | 4/2006 | Horton | |
| 7,089,678 B2 | 8/2006 | Novak et al. | |
| 7,091,473 B2 | 8/2006 | Rodi | |
| 7,118,601 B2 | 10/2006 | Yasui et al. | |
| 7,321,113 B2 | 1/2008 | Hare et al. | |
| 2002/0050756 A1 * | 5/2002 | Ito | H02K 11/215 310/135 |
| 2006/0250104 A1 * | 11/2006 | Reichert | G02B 26/122 318/651 |
| 2008/0149816 A1 * | 6/2008 | Wang | G01D 5/34707 250/231.18 |
| 2008/0186491 A1 * | 8/2008 | Baxter | G01D 5/38 356/364 |
| 2008/0189934 A1 * | 8/2008 | Henshaw | G01D 5/24452 29/602.1 |
| 2009/0108188 A1 * | 4/2009 | Urabe | G01D 5/34723 250/231.1 |
| 2010/0193671 A1 * | 8/2010 | Oshida | C23C 18/54 250/231.1 |
| 2011/0069390 A1 * | 3/2011 | Yoshida | G01D 5/3473 359/573 |
| 2011/0139971 A1 * | 6/2011 | Phillips | G01B 11/26 250/231.13 |
| 2011/0155895 A1 * | 6/2011 | Nagura | G01D 5/24438 250/231.14 |
| 2011/0282612 A1 * | 11/2011 | Cramer | G01D 5/24452 702/94 |
| 2011/0303831 A1 * | 12/2011 | Nagura | G01D 5/3473 250/231.14 |
| 2012/0026321 A1 * | 2/2012 | Hasler | G01D 5/24438 348/135 |
| 2013/0146755 A1 * | 6/2013 | Wagner | B23Q 7/06 250/231.13 |
| 2013/0253870 A1 * | 9/2013 | Agrawal | G01D 5/2455 702/94 |
| 2015/0171999 A1 * | 6/2015 | Cho | G01D 5/36 714/746 |

\* cited by examiner

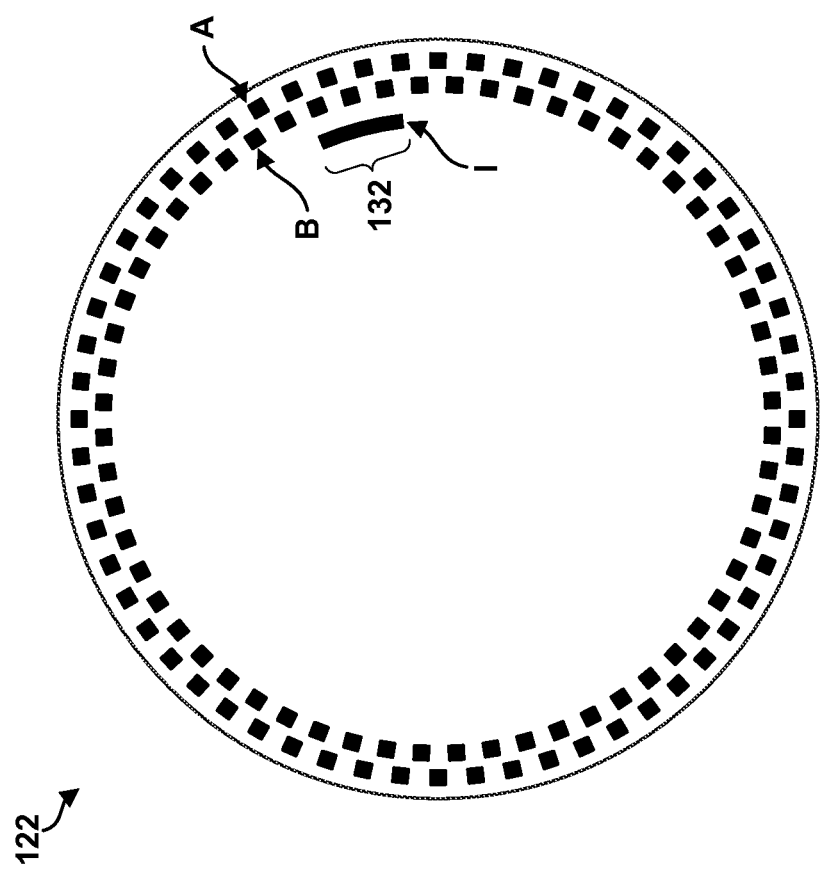

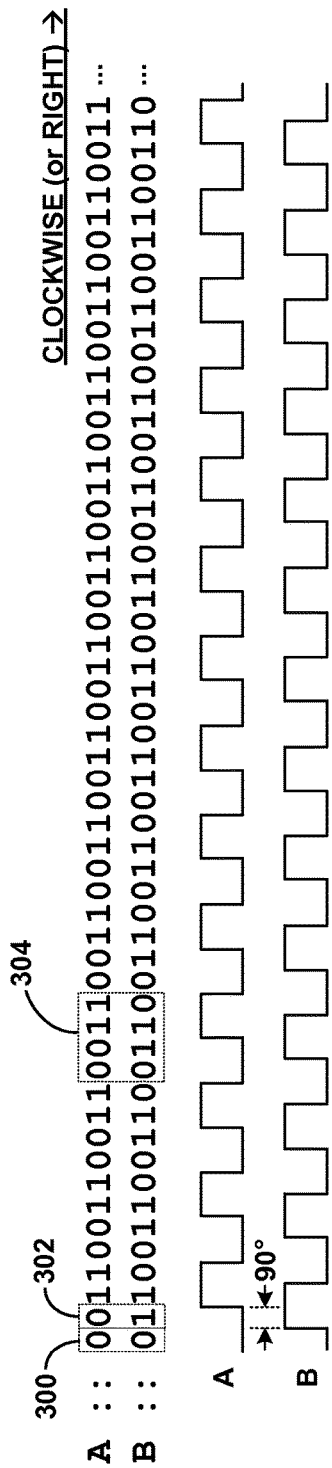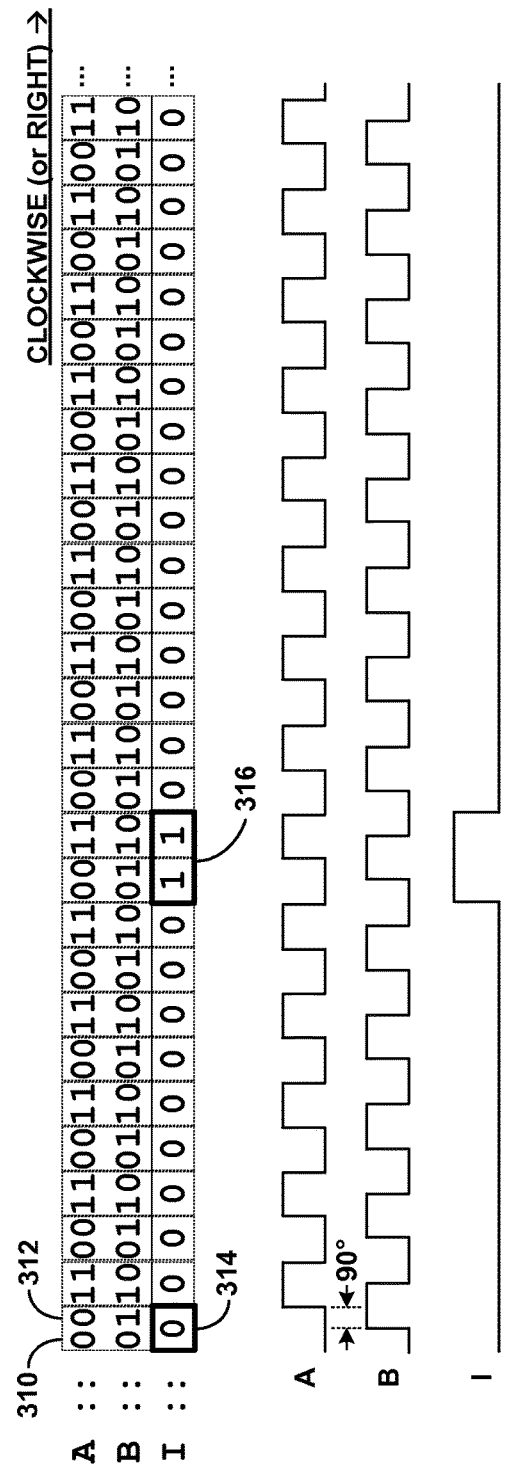

ENCODER DESIGN AND USE

BACKGROUND

An encoder, such as a linear encoder or rotary encoder, is an electro-mechanical device that converts the position or motion of a shaft or other mechanical machinery to an analog or digital code. Both linear and rotary encoders may be suited for applications in machine control which demand reliable and accurate position and/or motion feedback. Linear encoders, for instance, may be used in metrology instruments, high precision machining tools, and motion systems, such as gantry tables and cranes. And rotary encoders may be used to determine an angular position of a robotic joint, for instance, such as a joint of a robotic arm. Linear and rotary encoders may take the form of relative (or incremental) linear/rotary encoders and absolute linear/rotary encoders.

An output of a relative encoder provides information about motion of the shaft, which can be further processed into information such as speed, distance, and position. A relative encoder records changes in position, but may not have a predetermined relationship between its state and a position of the shaft. Some devices controlled by relative encoders may have to "home" to a fixed reference point of the relative encoder in order to determine such a position.

On the other hand, an output of an absolute encoder indicates a current position of the shaft. An absolute encoder maintains position information (i.e., encodes position values) even when power is removed from the absolute encoder, such that the position information can be available immediately upon applying power to the absolute encoder. A relationship between the position information and a position of the shaft may be established during assembly of the absolute encoder.

SUMMARY

Disclosed herein are implementations of encoder design and use. One implementation may involve moving a shaft, where the shaft includes an encoder with a first logical track, a second logical track, and a third logical track. The first logical track and the second logical track may include bit patterns that are readable to be 90 degrees out of phase with one another, and the third logical track may include a sequence of n numbers. Each number in the sequence may be represented by m bits, and the value of n may be greater than 1. The implementation may further involve, while moving the shaft, reading a number of the sequence from the third logical track and reading an extent of bits from the first or second logical track. The implementation may still further involve determining an orientation of the shaft based on the number and the extent of bits. Orientation of the shaft may include a linear position or an angular position of the shaft.

Another implementation may include a shaft, the shaft including an encoder including a first logical track, a second logical track, and a third logical track. The first logical track and the second logical track may include bit patterns that are readable to be 90 degrees out of phase with one another, and the third logical track may include a sequence of n numbers, each number in the sequence represented by m bits. The value of n may be greater than 1, and each number of the sequence may be representative of a position of the encoder. The implementation may further include one or more sensors. The implementation may still further include a controller, where the controller includes a microprocessor, data storage, and program instructions stored in the data storage and executable by the microprocessor to carry out operations. The operations may include moving the shaft. The operations may further include, while moving the shaft, reading, via the one or more sensors, a number of the sequence from the third logical track and an extent of bits from the first or second logical track. The operations may still further include determining an orientation of the shaft based on the number and the extent of bits.

Yet another implementation may involve a non-transitory computer readable medium having stored thereon instructions that, upon execution by a microprocessor, cause the microprocessor to perform operations. The operations may include instructing a shaft to move, where the shaft includes an encoder with a first logical track, a second logical track, and a third logical track. The first logical track and the second logical track may include bit patterns that are readable to be 90 degrees out of phase with one another, and the third logical track may include a sequence of n numbers. Each number in the sequence may be represented by m bits, and the value of n may be greater than 1. The operations may further include, while the shaft is moved, instructing one or more sensors to read a number of the sequence from the third logical track and to read an extent of bits from the first or second logical track. The operations may still further include determining an orientation of the shaft based on the number and the extent of bits.

Still another implementation may include a system that includes a means for moving a shaft, where the shaft includes an encoder with a first logical track, a second logical track, and a third logical track. The first logical track and the second logical track may include bit patterns that are readable to be 90 degrees out of phase with one another, and the third logical track may include a sequence of n numbers. Each number in the sequence may be represented by m bits, and the value of n may be greater than 1. The system may further include a means for, while moving the shaft, reading a number of the sequence from the third logical track and reading an extent of bits from the first or second logical track. The system may further include a means for determining an orientation of the shaft based on the number and the extent of bits.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 1D illustrates a top-down view of another example disc of an example rotary encoder.

FIG. 3A illustrates a linear view of example patterns on a relative encoder disc.

FIGS. 3B and 3C illustrate other linear views of example patterns on a relative encoder disc.

DETAILED DESCRIPTION

The following detailed description depicts various features and operations of the disclosed implementations with reference to the accompanying figures. The illustrative implementations described herein are not meant to be limiting. Certain aspects of the disclosed implementations can be arranged and combined in a wide variety of different configurations, all of which are contemplated herein. Many of the disclosed implementations are described with respect to example rotary encoders, but features and operations of the disclosed implementations may apply to linear encoders as well. Linear encoders may include a sensor that reads position data encoded on a linear track (i.e., a "scale" or "strip") and converts the encoded position into an analog or digital signal, which can then be decoded into a position by a controller.

Rotary encoders can be used with various systems to measure rotation of objects. One particular system in which a rotary encoder may be particularly useful is a robotic system. In a robotic system, a rotary encoder may be used to measure rotation of a robotic joint, such as a joint of an arm or a leg. In turn, a microprocessor or other computing device included in the robotic system may use this rotation to determine a displacement, a velocity, an acceleration, and/or an angular position of the robotic joint. In some scenarios, a rotary encoder may be included at every degree of freedom of a robotic appendage, other robotic device, or other system of bodies. The microprocessor other computing device may thus monitor a position of the system of bodies at every degree of freedom.

Figure 1A:
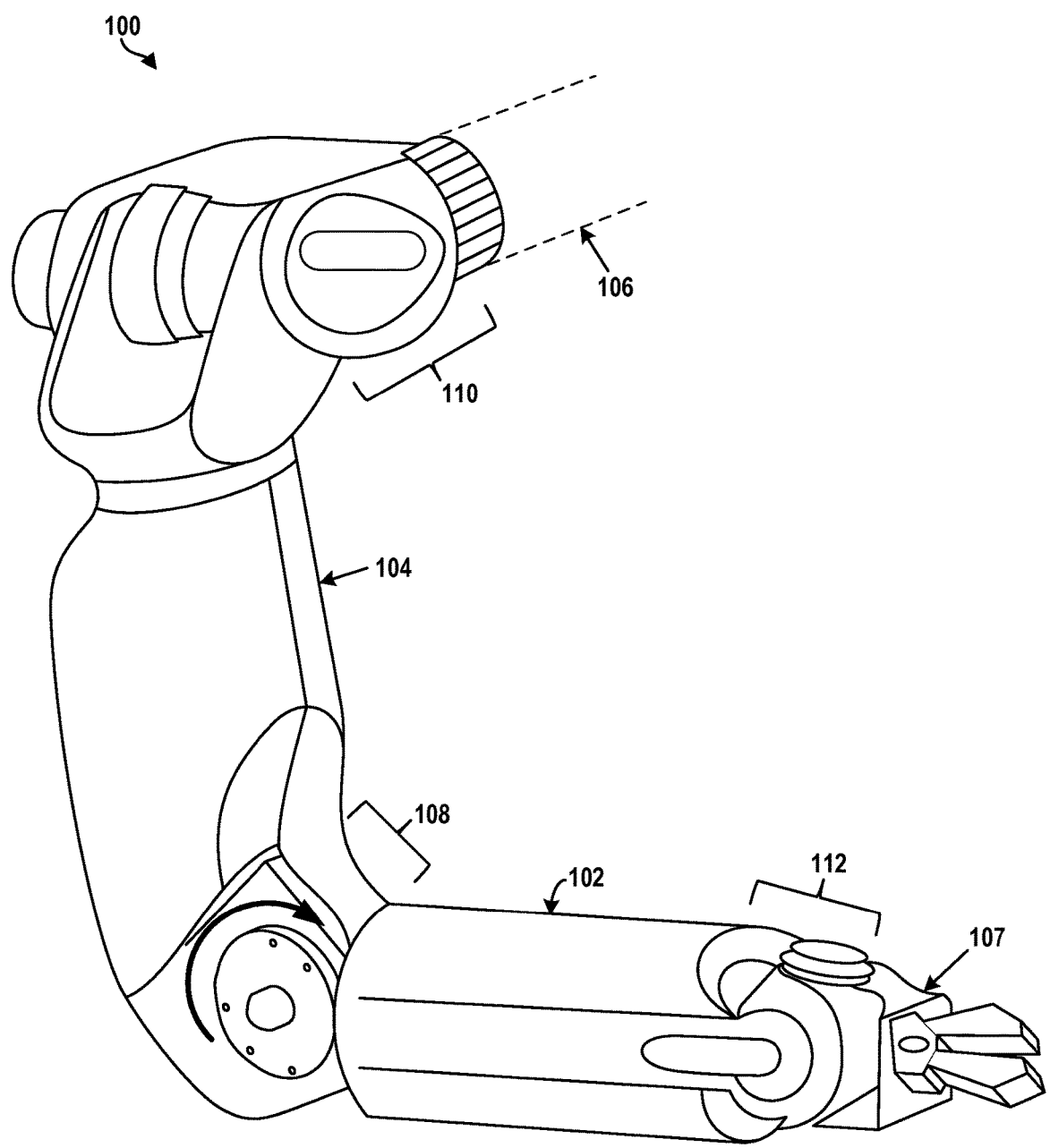
FIG. 1A illustrates an example robotic appendage in a form of a robotic arm.

FIG. 1A illustrates an example robotic appendage 100 in a form of a robotic arm that includes members 102, 104, 106, and 107 coupled through joints 108, 110, and 112. Each of joints 108, 110, and 112 may include a shaft (not shown) that can be rotated at a given range of speeds with a given range of torques. A microprocessor (not shown) may be configured to operate the robotic appendage 100, such as by instructing one or more of the shafts to rotate.

Furthermore, each joint shaft (or axle) may include a rotary encoder configured to provide the microprocessor with electrical signals that the microprocessor can use to determine an angular position of the shaft, such as a position representative of an angle between two members, and/or to determine other information. For example, absolute encoders may typically be used to determine a current distinct angular position of the shaft. As another example, relative encoders may typically be used to determine information such as angular displacement, speed, and acceleration. For instance, when a microprocessor of a relative encoder system senses that a shaft has rotated from one angular position to another angular position over a given period of time, the microprocessor can determine the distance between the two angular positions and/or use the given period of time to determine the speed or acceleration of the rotation. Some absolute encoders may be configured to indicate information such as angular displacement, speed, and acceleration as well.

In addition to shafts which a joint rotates about, encoders may also be included on motor shafts. A motor shaft may be the same as a joint shaft (i.e., a motor that includes a shaft with an encoder on that shaft, where the motor can be instructed to rotate the shaft) or may be connected to a joint shaft via some mechanical linkage. Based on a gear ratio between a motor and a joint, a controller knowing an absolute position of the motor shaft may or may not be sufficient information to unambiguously know the position of the joint shaft. Thus, a separate encoder for the joint shaft may be desirable.

In some scenarios, an encoder may be used to track a position of a coil included in a motor. Further, a rotary encoder can be used to track the position of a motor shaft on a permanent magnet brushless motor, such as a motor used for computer numerical control (CNC) machines, robotic devices, and/or industrial equipment, and may synchronize relative rotor magnet and stator winding positions to current provided by the drive. In other scenarios, an encoder may be included on a drive shaft, such as a drive shaft of a robotic vehicle, and may be used to sense gear teeth on the drive shaft. Other encoder/shaft applications are possible as well.

Figure 1B:
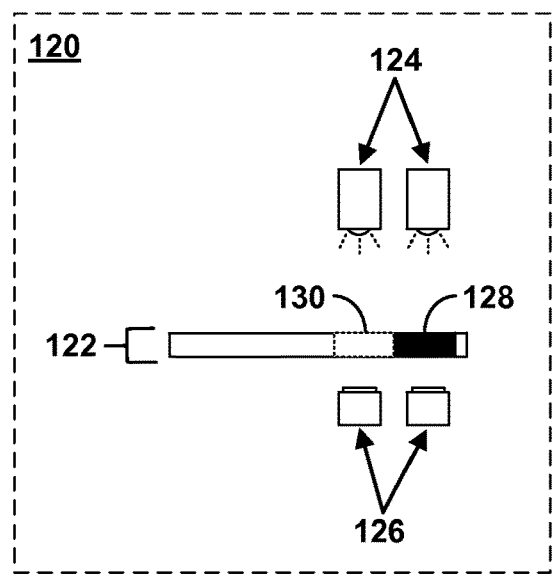
FIG. 1B illustrates a side view of an example rotary encoder.

FIG. 1B illustrates a side view of an example rotary encoder 120, which includes a disc 122, an array of light emitting diodes (LEDs) 124, and an array of photo detectors 126. Such a disc 122 can be used in either an absolute encoder system or a relative encoder system.

Figure 1C:
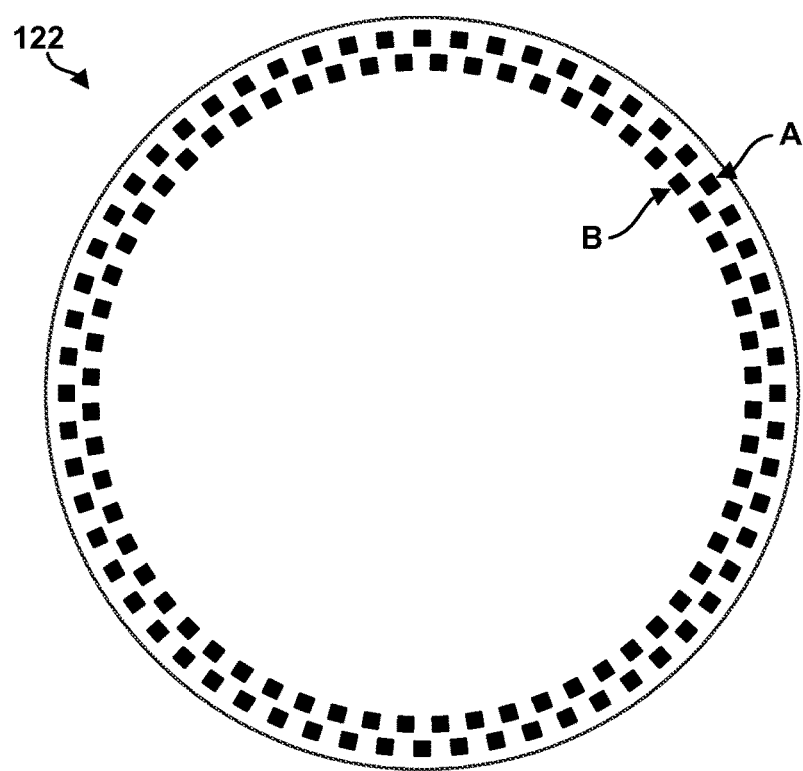
FIG. 1C illustrates a top-down view of an example disc of an example rotary encoder.

A top-down view of the disc 122 is illustrated in FIG. 1C. The disc 122 may be a transparent piece of material (e.g., glass) that may have a pattern printed onto it so that there are multiple concentric tracks of alternating opaque and transparent sections, such as Track A and Track B shown in FIG. 1C. Tracks such as these may be located on or near the edge of a disc for a rotary encoder, but the same technique can be used on a linear strip as well. The opaque sections, such as section 128, may be equally spaced from one another and may deflect light provided by the LEDs 124, whereas the disc may also include transparent sections, such as section 130, which may be equally spaced from one another and may allow light provided by the LEDs to pass through disc 122. The LEDs 124, one associated with each track, may be located on one side of the disc, and the photo detectors 126, one associated with each track, may be located on the other side of the disc.

Thus, to read a particular track of the disc 122 (or a linear strip, for linear encoders), the photo detector associated with that track may determine that a transparent portion of its track is under its read head when it receives light, whereas that photo detector may determine that an opaque section of its track is under its read head when it does not receive light. Accordingly, as the shaft rotates, the patterns of opaque/transparent sections printed on the disc 122 may be read/detected by the photo detectors 126, which may in turn transmit an electric signal output representative of the pattern to the microprocessor and/or other external electronics configured to receive the electrical signal output.

For absolute encoders, the electrical signal received by the microprocessor across at least one track at a given position may represent a unique value (e.g., a data word), which thus enables absolute encoders to determine a distinct position of the shaft at any given point in time. Although only two tracks are illustrated in FIG. 1C, an absolute rotary encoder may include more than two tracks, or even more than three tracks. For instance, to monitor N different angular positions of an absolute rotary encoder, the absolute rotary encoder may include $\log_2 N$ tracks (rounded up). However, some robotic systems and other types of systems that use encoders, both linear and rotary, may have numerous (e.g., hundreds) positions to be monitored, and thus it may be disadvantageous to use absolute encoders due to the high cost and complexity incurred by an absolute encoder with many tracks and the LEDs and photo detectors associated with those tracks.

Accordingly, relative encoders may be used instead of absolute encoders in order to reduce cost and complexity of encoder design. For relative encoders, the electrical signal discussed above may be used to determine an offset that is associated with a specific position. The microprocessor may count positions as the shaft rotates, where a current count may represent a position of the shaft with respect to an initial reference position, or "home" position (i.e., how far from the initial reference point the shaft has rotated). As such, to initialize a relative encoder system, a disc or linear strip of the relative encoder may need to be moved until the initial reference point on the disc or the linear strip is located. This process may be referred to as a "homing" process, and the initial reference point may be referred to as an index pulse located on an index track (hereinafter "I track") of the disc or linear strip. For example, as illustrated in FIG. 1D, the disc 122 may include an index pulse 132 on an I track.

In some encoder systems, a rotary encoder disc or linear encoder track may not include physically separate tracks (e.g., separate A, B, and I tracks). Rather, one or more of these tracks may be printed on the disc or the linear strip such that the tracks share at least a portion of the same area as one another on the disc or the linear strip. For instance, I track data may be encoded on top of the A and B tracks. As such, tracks such as the A, B, and I tracks may be referred to herein as "logical tracks."

Various problems can arise with a relative encoder in electro-mechanical systems, such as robotic systems. For instance, sensors of a relative encoder system may miss a detection of physical motion or count additional motion when no such additional motion occurred. This can cause the relative encoder system to (i) determine that it is at a position short of the position where it should be, (ii) determine that it is at a position farther than the position where it should be, or (iii) experience an invalid/illegal state transition. These scenarios may result from the relative encoder disc or linear strip being dirty, dusty, or damaged, by a movement occurring at high speeds, by electrical noise, and/or by unexpected external forces being applied to the system, among other possible causes.

There may be safety concerns when a relative encoder system determines an incorrect position of a shaft (i.e., determines that the shaft is at a given position when the shaft is actually at a different position). For example, in order for a relative encoder system to check itself for errors and determine what position the shaft is at, the system may perform the homing process. In robotic systems, for instance, this may involve the relative encoder system rotating one or more joints of a robotic appendage through a large angular distance (e.g., through most or all of the range of motion of a joint). In doing so, the robotic appendage may collide with itself, other robotic devices, other objects, and/or nearby persons, thus causing harm to those robotic devices, objects, persons, and/or to the robotic appendage itself. This damage may be especially problematic when the robotic appendage is large, powerful, and its joints are rotating at high speeds. Furthermore, even when the homing process is not likely to result in a collision, the homing process may still take more time and energy than desired, which can be problematic as well.

Accordingly, provided herein are implementations relating to relative encoder design and use that may overcome at least some of these problems. Generally, these problems may be overcome by including more information on the I track (or another type of track) of a relative encoder disc or linear strip, thus reducing the distance that the relative encoder system has to move the shaft from any given position in order to determine the actual location of the shaft. Additionally, the relative encoder system may be provided with more opportunities to determine whether an error has occurred and may only need to move the shaft a short distance to detect an error, thus increasing the speed and probability at which such errors may be detected. Furthermore, in some implementations, no changes to other tracks (e.g., the A and B tracks) are used, nor are any changes made to the LEDs, photo detectors, or other hardware. Thus, these improvements to the relative encoder can be quickly and inexpensively integrated into a system or device.

Figure 2:
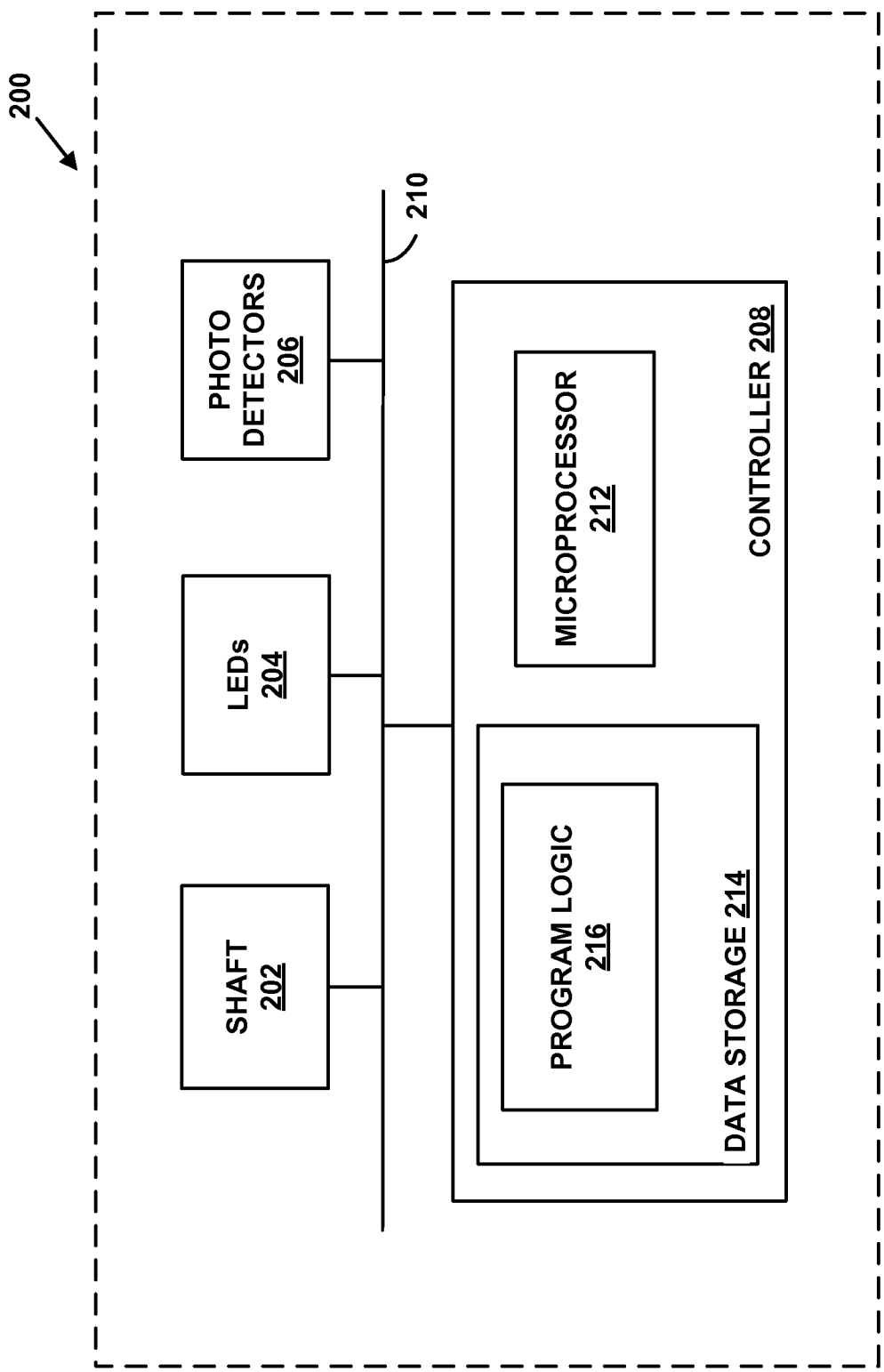
FIG. 2 illustrates a block diagram of an example encoder system.

FIG. 2 illustrates a block diagram of an example encoder system 200, such as a relative encoder system. In some examples, some components illustrated in FIG. 2 may be distributed across multiple computing systems. However, for the sake of example, the components are shown and described as part of one example system 200.

The system 200 may include a shaft 202, LEDs 204, photo detectors 206, and a controller 208. Components illustrated in FIG. 2 may be linked together by a communication link 210. The communication link 210 is illustrated as a wired connection; however, wireless connections may also be used. The system 200 may also include hardware to enable communication within the system and between the system and other computing devices (not shown). The hardware may include transmitters, receivers, and/or antennas, for example.

The shaft 202 may be a shaft included in a joint of a robotic appendage, as described above with respect to FIG. 1A, or may be a shaft that moves along a linear track. The LEDs 204 may be any type of optical device configured to produce light. The photo detectors 206 may be any type of optical sensor configured to detect light. Further, the system 200 may include other sensors relating to joints or members of a robotic appendage (or relating to mechanical objects associated with a linear encoder system) that may affect measurements that the encoder system determines, such as an accelerometer, gyroscope, load cells, strain gauges, or other types of sensors that may collect and provide data to the controller 208.

The controller 208 may be configured to control other components of the system 200, such as the shaft 202, LEDs 204, and photo detectors 206, and may include a microprocessor 212 and data storage 214.

The microprocessor 212 may, for instance, comprise a single or multi-core processor, an application specific integrated circuit, and/or other suitable circuitry. Alternatively, the microprocessor 212 may take the form of hard-wired circuitry.

The data storage 214 may store program logic 216 that can be accessed and executed by the microprocessor 212 to perform operations associated with the disclosed implementations. These operations may include moving the shaft, receiving electrical signals determined by the photo detectors 206 when the photo detectors read the disc or linear strip associated with the shaft, and determining an orientation of the shaft based on the received electrical signals, for example. Herein, the "orientation" of the shaft may refer to a linear position of a linear encoder system or an angular position of a rotary encoder system. Any operations described herein, or other example operations may be performed by the microprocessor 212 or one or more other processors (not shown) via execution of instructions stored on the data storage 214 or otherwise received by the controller 208. These operations may also be performed in conjunction with other components of the encoder system.

Within some examples herein, operations may be embodied on a computer program product (e.g., a tangible computer readable storage medium or non-transitory computer readable medium) that includes instructions executable to perform the operations.

Figure 3C:
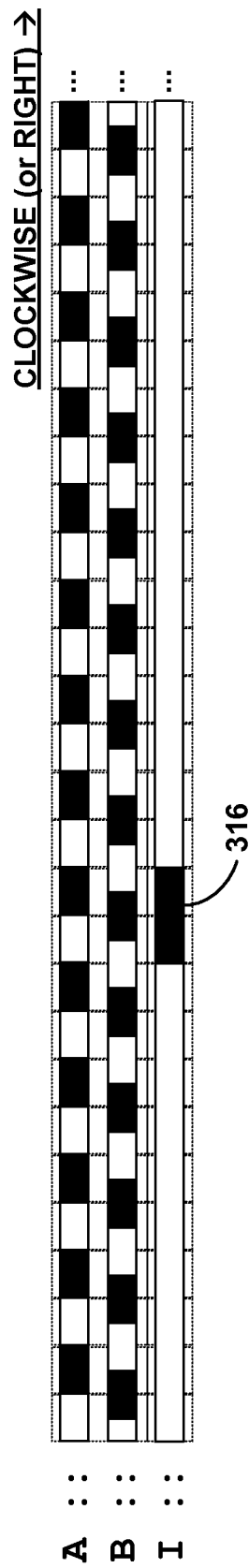

FIGS. 3A-3C are next described with respect to rotary encoder systems. However, it should be understood that details included with respect to rotary encoder systems can also apply to linear encoder systems. For example, language such as "clockwise" and "counterclockwise" rotation of a shaft may correspond to rightward and leftward linear movement, respectively, of a shaft (or other device on which a linear encoder is included) for linear encoder systems. As another example, language such as "angular position" may correspond to linear position for linear encoder positions.

FIG. 3A illustrates a linear view of example patterns of an A track and a B track of a relative encoder disc included as part of a rotary encoder system. Namely, FIG. 3A illustrates how the patterns of the A and B tracks may be implemented as bits as the disc rotates without changing direction. As shown in FIG. 3A, the A and B track patterns may be offset from one another by 90 degrees in phase, and the pattern used for each track may take the form of a square wave with a 50/50 duty cycle (i.e., the amount of time that the signal is high is equal to the amount of time that the signal is low). However, in other examples, a single logical track may be used instead of A and B tracks, in which case photo detectors (or other sensors) of the rotary encoder system may be physically offset from one another such that the bit patterns of the single logical track are read by the photo detectors (or other sensors) to be 90 degrees out of phase.

Additionally, a bit value of 0 may be used to indicate transparent patterns and a bit value of 1 may be used to indicate opaque patterns (although these indications may be reversed in other implementations not described herein; e.g., 0 indicates opaque and 1 indicates transparent). As such, at a given angular position of the shaft, the relative encoder system may read a 0 or 1 on the A track and may read a 0 or 1 on the B track. For example, as the shaft rotates clockwise from position 300, the relative encoder system may read the following output states: 00 to 01 to 11 to 10 to 00, and so forth, where A and B are both values of 0 for state 00, where A is a value of 0 and B is a value of 1 for state 01, and so on. The relative encoder system may read the following output states during a counterclockwise rotation of the shaft: 00 to 10 to 11 to 01 to 00, and so forth. A relative encoder that includes two output states such as these that are 90 degrees out of phase with one another may be referred to as a quadrature encoder. A scenario where both A and B values change from one state to the next may be referred to as an invalid, or "illegal," state transition (e.g., A transitions legally but B transitions illegally, perhaps due to electrical noise or other causes).

With respect to FIG. 3A and other implementations described herein, the smallest unit of angular distance (i.e., the smallest change in angular position) of a rotating shaft that can be read by a relative encoder system may be referred to as a "tick." Bits encoded in patterns on the A and B track may be one tick wide. However, bits encoded in patterns on the A and B tracks may be more than one tick wide in other implementations.

Furthermore, while the description herein may include language referring to the relative encoder system "reading" the disc (i.e., reading the ticks on the disc so as to read data encoded along the disc), this language may imply that photo detectors or other sensors included as part of the relative encoder system may perform the actual reading of the disc and translation of the ticks into bits.

FIG. 3A illustrates example adjacent ticks 300 and 302 along the A and B tracks. As such, the relative encoder system may read state 00 at tick 300, and may read state 01 at tick 302. Four different, adjacent ticks that are read in a given direction (e.g., 00 to 01 to 11 to 10, for a clockwise rotation) are collectively referred to as one "quadrature cycle" rotation of the shaft. An example quadrature cycle 304 is also shown in FIG. 3A.

Given any state of A and B, there may be a second state one tick to the right of it, and a third state one tick to the left of it. By observing which state the relative encoder system is in, and which state the relative encoder system goes to next, a microprocessor and other components controlling the relative encoder system may determine whether the disc has moved one tick to the left, one tick to the right, or has stayed in the same place. This enables the relative encoder system to know the relative position and relative direction of the disc at any given point in time to within ½ of a tick.

The sequence encoded on the example disc patterns illustrated by FIG. 3A that is read by the relative encoder system is a gray code sequence where two successive states differ by only one bit, although alternate sequences of numbers are possible in other implementations.

As discussed above, the microprocessor may count a sequence of numbers as the shaft rotates in order to determine an angular position of the shaft. And the shaft may also include an I track in addition to the A and B tracks, where the I track serves as an absolute reference when determining the angular position of the shaft. Namely, the I track may include an index pulse as the absolute reference, so that when the microprocessor cannot determine a current angular position of the shaft, the microprocessor can rotate the shaft until the relative encoder system reads at least an edge of the index pulse.

In addition, the index pulse may serve as a fixed location to which the tick counts are relative. For instance, a relative encoder with 10,000 ticks may count the ticks relative to the location of the index pulse (i.e., if the index pulse is position zero, the tick adjacent to the index pulse in the clockwise direction may be counted as tick number one, whereas the tick adjacent to the index pulse in the counterclockwise direction may be counted as tick number 9,999). Further, each time the relative encoder system detects that it has passed the index pulse, the system may determine that an additional 10,000 ticks have been counted.

FIG. 3B illustrates a linear view of example bit patterns of an A track, a B track, and an I track of a relative encoder disc, according to an example embodiment. As shown, the A track and B track of FIG. 3B may be the same as in FIG. 3A. Additionally, as illustrated by FIG. 1D, the I track may contain one opaque mark on the entire track which may serve as the index pulse 132.

As discussed above, one bit encoded on the A and B tracks may be one tick wide. For instance, as shown in FIG. 3B, the A and B tracks each have one bit encoded at tick 310 and each have another bit encoded at tick 312. In some implementations, one bit encoded on the I track may be one tick wide. This may increase the density of data encoded and printed on the I track. While this can be accomplished in some scenarios, it may be more desirable in other scenarios to have one bit (or value) encoded on the I track be two ticks wide or wider. For instance, as shown in FIG. 3B, one bit of the I track 314 (i.e., 0) may be two ticks wide, such as the width of ticks 310 and 312 together. Henceforth, reference to a "bit" on the I track will refer to an encoded value that is two ticks (or units of angular distance) wide, whereas reference to a "bit" on the A and B tracks will refer to an encoded value that is one tick (or unit of angular distance) wide. As noted above, however, other relationships between bits and ticks are possible.

In line with this arrangement, the index pulse 316 shown on the I track in FIG. 3B may be two I track bits wide. The index pulse may be less than two bits wide (e.g., one tick wide) or more than two bits wide in other implementations. Further, in still other implementations, additional marks of varying widths may be present on the I track as well to serve as an index pulse.

FIG. 3C illustrates example opaque/transparent patterns of FIG. 3B as they might appear on the disc of a relative encoder, including an opaque mark representing the two-bit wide index pulse 316 on the I track. In some implementations, such as those illustrated in FIGS. 3B and 3C, the B track may be used as a clock to provide timing to the relative encoder system for reading and interpreting the data on the I track of the disc. (However, in other implementations, the A track may be used as the clock as an equally-advantageous alternative to the B track.) As such, data encoded on the I track may be synchronized to the A or B tracks.

When data on the I track is serialized in accordance with a clock such as the B track, the clock track may indicate to the relative encoder system when to cause the photo detectors to read the I track. For instance, the relative encoder system may be programmed to read the I track on the rising edge of the clock (i.e., when B goes from 0 to 1), read the data on the falling edge (i.e., when B goes from 1 to 0), or read on both edges. When reading on one edge, there may be one rising/falling edge per quadrature cycle (e.g., one rising/falling edge every four ticks of the B track). And, when reading on both edges, the I track may be read every two ticks of the B track (i.e., every time the B track changes state). In some implementations, however, reading on only one edge may result in the relative encoder system missing bits on the I track (unless there are at least four ticks per bit, for instance).

A potential drawback to the A/B/I track configuration illustrated in FIGS. 3B and 3C may be that when the relative encoder system is initialized, the shaft may need to be homed to find the index pulse. This may cause problems such as an increased risk of a robotic appendage colliding with itself or other objects or persons as the shaft rotates during the homing processes. Additionally or alternatively, the homing processes may take excessive time and power. Accordingly, it may be desirable for the I track of a relative encoder to have multiple reference points for use during the homing process. With this arrangement, less joint rotation may be needed during the homing process.

This arrangement may be accomplished by including more information on the I track of the relative encoder disc. Instead of having a single encoded reference location, such as an index pulse, represent an absolute angular position of a relative encoder system, at least some of the problems discussed above may be overcome by encoding multiple, unique sets of data on a relative encoder disc, each set of data corresponding to a different absolute angular position. In addition, having multiple absolute angular positions on a relative encoder disc may also help overcome at least some problems relating to error detection. For instance, such a relative encoder system may be able to recover more quickly from slippage without needing to rotate a large distance, due to there being multiple absolute angular positions encoded on the disc and serving as multiple reference locations. An arrangement similar in concept to that described above can also be applied to linear encoder systems as well.

Figure 4:
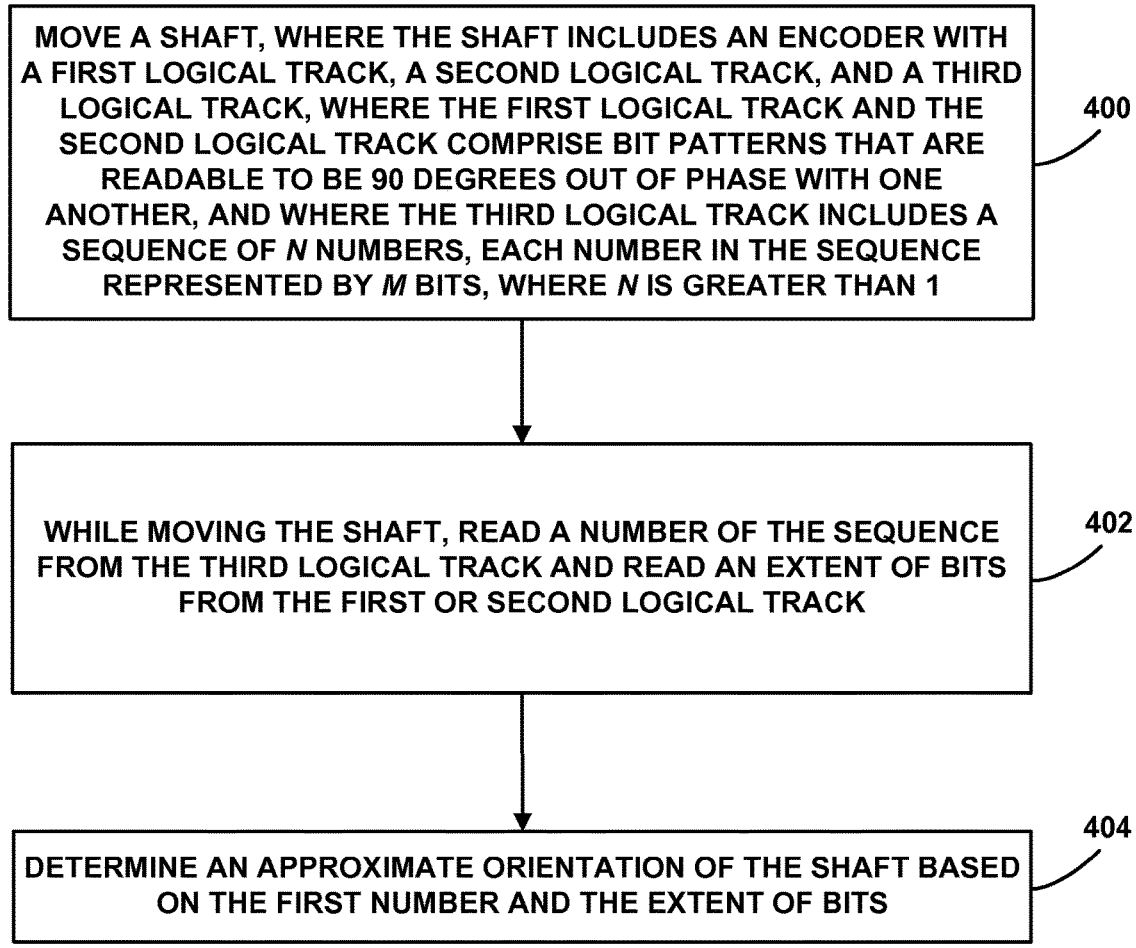
FIG. 4 is a flow chart illustrating example operations relating to relative encoder design and use.

FIG. 4 is a flow chart illustrating example operations relating to relative encoder design and use for overcoming at least some of the problems discussed above. The operations of the flow chart may be embodied as computer executable instructions stored on non-transitory media, for example, that may be executed by a device or by one or more processors.

At block 400, a shaft may be moved, where the shaft includes an encoder with a first logical track, a second logical track, and a third logical track. The first logical track and the second logical track may include bit patterns that are readable to be 90 degrees out of phase with one another. As noted above, a single logical track may be used instead of a first and second logical track, in which case photo detectors (or other sensors) of the relative encoder system may be physically offset from one another such that the bit patterns of the single logical track are read by the photo detectors (or other sensors) 90 degrees out of phase.

The third logical track may include a sequence of n numbers, where each number in the sequence represented by m bits, and where n is greater than 1. Each of the n numbers on the third logical track may correspond to a respective relative linear position or a respective angular position of the shaft that the relative encoder system can obtain. Herein, the terms "first logical track" (or "first track") and "second logical track" (or "second track") may refer to the A track and B track respectively or vice versa, and the term "third logical track" (or "third track") may refer to the I track. The first, second, and third logical tracks may be concentric on a disc of a relative rotary encoder or may be linearly adjacent to each other or otherwise positioned on a linear strip of a relative linear encoder.

At block 402, while moving the shaft, a number of the sequence from the third logical track is read. In addition, an extent of bits from the first or second logical track is read. The extent of bits may refer to extent of ticks read from the first or second logical track, where the extent of ticks includes information encoded on the first or second logical track. The first logical track, second logical track, and third logical track may all be read by the relative encoder system at the same time.

In some scenarios, at least part of another number of the sequence from the third logical track (e.g., the sync pattern of the other number) may be read, where the number that is read first and the other number are consecutive in sequence.

At block 404, an orientation of the shaft may be determined based on the number and the extent of bits. The number may be a given readable angular or linear position that, when read and successfully decoded by the relative encoder system, may indicate the given readable angular or linear position to the system. The extent of bits may represent a counted offset that may be added to the given angular or linear position to determine the actual orientation (e.g., actual angular or linear position) of the shaft. (An example of this is described with respect to FIG. 5.) The extent of bits may refer to an amount of A/B track bits, or ticks, counted by a counter of the relative encoder system. In practice, the counter may increment one when the shaft moves one tick in one direction, and may decrement one when the shaft moves one tick in the other direction. As noted above, the counter may increment/decrement at A/B state transitions, so long as the state transitions are valid. When an invalid state transition (or other error) is detected, the relative encoder system may respond by re-homing.

While the extent of bits may be read from the first or second track, in other implementations an extent of bits may be read from both the first and second tracks for purposes of the microprocessor determining a direction of linear movement or a direction of rotation of the shaft. As discussed above, either the first or the second track may provide timing to the relative encoder system, and thus the extent of bits that the relative encoder system reads from the first or second track (whichever is the clock track) may indicate to the relative encoder system when to read the third track. And, the extent of bits may be read from both the first and the second track in order to help the relative encoder system determine a position of the shaft.

To count multiple subsequent positions that correspond to the numbers read from the third track, a de Bruijn sequence, gray code sequence, chain code sequence, or other type of sequence may be used to encode the multiple positions. As such, the microprocessor may decode the number read for each position using methods associated with the type of sequence used to encode the multiple positions. Additionally or alternatively, as the shaft rotates, the microprocessor may refer to a lookup table stored in memory of the microprocessor or stored in other data storage remote from the microprocessor or remote from the entire relative encoder system. The lookup table may include angles or linear positions that correspond to each number read and decoded from the third track, for instance.

In practice, the amount of desired readable positions may be high and there may be a need for precise measurements of position, such as for a shaft in a joint of a robotic appendage with a large range of rotation. For instance, it may be desirable to have 500 readable positions (i.e., n=500), where each of the 500 positions is represented by m bits.

Furthermore, as discussed above, bits on the first and second tracks (i.e., the A and B tracks) may be one tick wide, whereas bits on the third track (i.e., the I track) may be two ticks wide. As such, for a relative encoder disc or linear strip with n readable positions, where each of the readable positions is represented by m bits, the disc or strip may include 2×m×n ticks. For a relative encoder shaft with 100 readable positions, the disc or strip may include 200×m ticks. The number of bits used to represent each of relative position, m, may vary based on design choice, such as based on how many ticks are on a given disc or strip and the number of readable positions.

Figure 5:
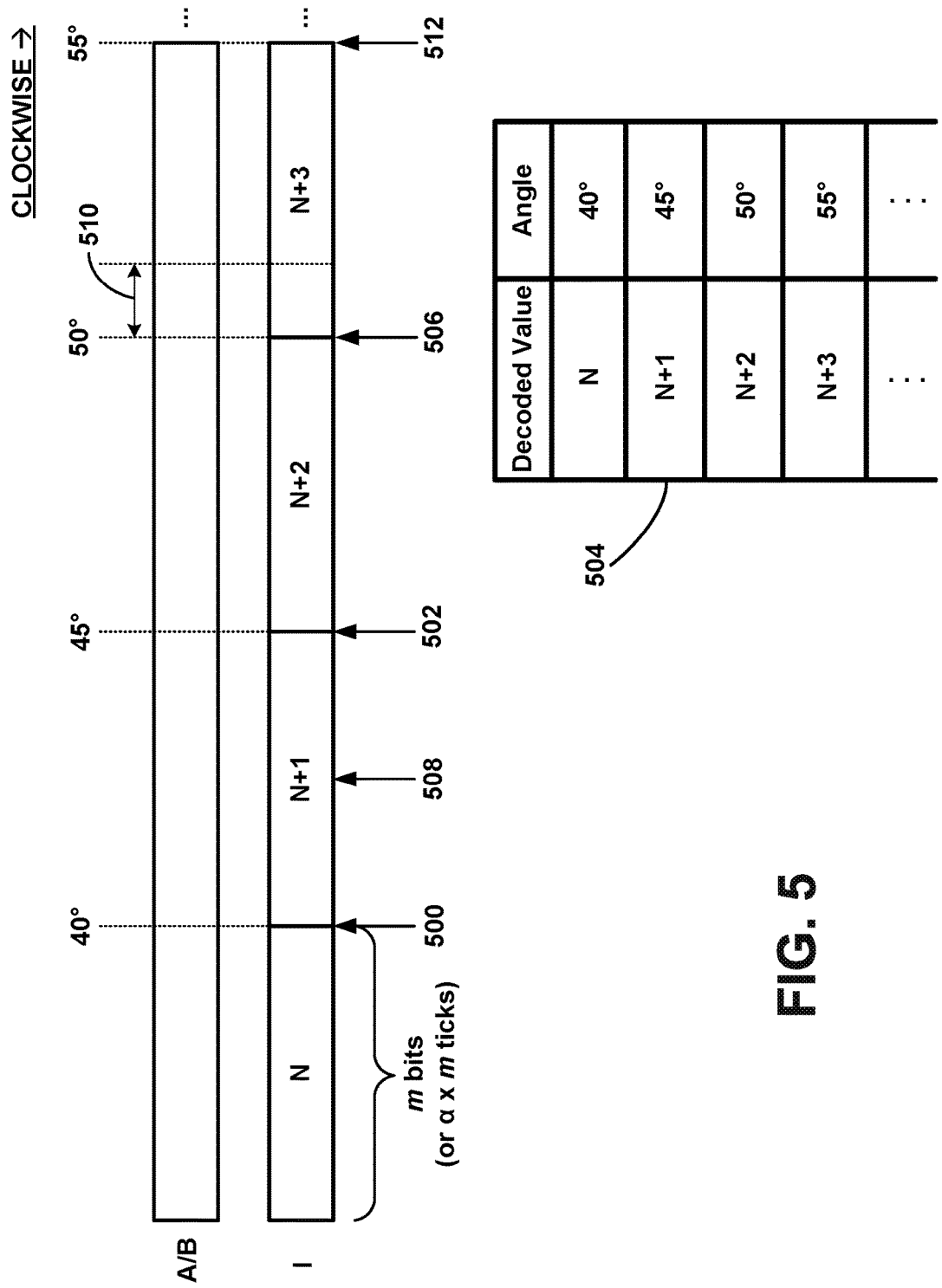
FIG. 5 illustrates an example implementation in which at least a portion of the example operations are performed.

FIG. 5 illustrates an example implementation of at least a portion of the operations described herein. More particularly, FIG. 5 illustrates four numbers, or readable angular positions, on an I track of a relative encoder disc: N, N+1, N+2, and N+3. Detailed bit patterns on the A, B, and I tracks are not shown in this example.

For the relative encoder system to read and decode one angular position, the relative encoder system may read m bits from the third track, where each bit of the third track (i.e., I track bits) may be α ticks wide, such as two ticks wide as described in some examples herein (e.g., α=2). However, in other examples, α may be 1 or greater than 2.

Because each readable angular position may be represented by m bits, the relative encoder system may expect a new angular position to be read and decoded every m bits after a previous angular position has been decoded. For example, when the shaft rotates from location 500 to location 502 (assuming no error) the relative encoder system will read m bits and, upon reaching location 502, the system can decode number N+1 and refer to a lookup table 504 to determine that, at location 502, the shaft is at 45 degrees from a pre-established reference angle of 0 degrees. Further, the relative encoder system may then expect that as the shaft continues to rotate clockwise, number N+2 will be read and decoded m bits from location 502 (i.e., at location 506). Upon reaching location 506, for instance, the system can decode number N+2 and refer to the lookup table 504 to determine that, at location 506, the shaft is at 50 degrees. As shown, each angle in the lookup table 504 may be mapped to a particular location along the disc. Thus, the relative encoder system may know where each readable angular position should begin and end on the I track.

As discussed above, the implementation illustrated in FIG. 5 may allow the relative encoder system to home quickly from any given starting location. When the shaft moves in one direction from any given starting location, the counter of the relative encoder system may be initialized when a first number is read and successfully decoded, where the decoded number indicates an angular position of the shaft. Thus, the rotation required of the shaft for the relative encoder system to determine the actual angular position of the shaft is not much. In an example scenario, from a given starting location of location 508, the relative encoder system may rotate the shaft clockwise to location 506, at which number N+2 is decoded, the system determines that the angular position is 50 degrees, the counter is initialized (e.g., set to zero), and the system is homed. As the shaft continues to rotate clockwise from location 506, the system may count an offset of ticks 510 (i.e., A/B track bits, or "the extent of bits," as noted above) determined by the counter and the system can use the offset to determine an angular position of the shaft between location 506 (50 degrees) and location 512 (55 degrees). For instance, the offset may indicate that the shaft is at an angular position of 52 degrees. Other examples are possible as well.

The relative encoder system may continuously check a count of ticks determined by the counter as the shaft rotates, such as every time a number is read off the I track. This count may be used by the system to determine the position of the shaft and to determine whether an error has occurred. In an example scenario, as the shaft rotates clockwise from location 500 (after the system has just decoded number N), the system may expect to read and decode number N+1 after having read α×m bits (i.e., α×m ticks) from the first or second track beyond location 500, since each number is α×m A/B track bits long (i.e., m I track bits long). Thus, if the system reaches the beginning (e.g., a "sync bit pattern") of encoded number N+2 and the counter indicates that the shaft has rotated more or less than α×m ticks, the system may determine that an error has occurred and may responsively re-home. As a more specific example, the system may expect that it will read and decode number N+1 50 ticks (α×m ticks, where α=2) after location 500 because each number is 25 bits long (i.e., m=25). If the system reaches location 502 and the counter indicates that the shaft has only moved 49 ticks, the system may determine that there was a previously-undetected encoder slip on the A/B tracks and the microprocessor may responsively generate an error condition, such as a flag indicating the error condition. The relative encoder system may thus to re-home to recover from the error.

In another error scenario, the system may detect that an invalid state transition has occurred as the shaft rotates. Because the A and B tracks are 90 degrees out of phase with each other, only one bit on either the A or B track should change as the relative encoder system reads two sequential radial bit positions, or ticks. Therefore, when the microprocessor detects that bits on both or neither of the A and B tracks have changed between a sequential pair of radial bit positions, an error may have occurred. The relative encoder system may then re-home to recover from the error.

It should be understood that shaft movement for homing and determining angular position is not limited to clockwise rotation of the shaft and may additionally or alternatively involve counterclockwise rotation.

The m bits that represent each number of the sequence may include various sub-patterns of bits. For example, one set of m bits may include a "sync" bit pattern represented by x bits. The sync bit pattern may serve as a marker that, when read, indicates a new position encoded on the third track. The sync bit pattern may be a pattern of bits that might never occur anywhere else in the m bits. For instance, the sync bit pattern for one position may include four or more I track bits, each with a value of 1. Other example sync bit patterns are possible as well.

Further, the set of m bits may include one or more "data" bit patterns, each represented by y bits. The one or more data bit patterns of a particular position may together form a relative data bit pattern that is encoded on the third track to represent that particular position. More particularly, the relative data bit patterns may be encoded on the third track such that as the shaft rotates, a sequence of the relative data bit patterns can be read in order to determine a position of the shaft associated with the counted sequence. The position may be determined by looking up, in a table stored in memory, the position that corresponds to the read sequence.

Still further, the set of m bits may include multiple padding bit patterns, each represented by z bits, that separate the data bit patterns from each other and from the sync bit pattern, and that are different from the sync bit pattern. For instance, the sync bit pattern may include a pattern with all values of 1, whereas each of the padding bit patterns may include at least one value of 0.

In an example implementation, each position of a sequence of n readable positions may be represented by a 13-bit number (i.e., m=13 for each of the n numbers) encoded on the third track along the shaft may include a 4-bit sync bit pattern, followed by a 1-bit padding bit pattern, followed by a 3-bit data bit pattern, followed by another 1-bit padding bit pattern, followed by another 3-bit data bit pattern, followed by yet another 1-bit padding bit pattern. Further, if there are 100 readable positions desired, for instance, a relative encoder shaft with 2600 ticks (i.e., 2×13×100) may be used. Other implementations are possible as well, including other respective arrangements of bit patterns that serve as respective absolute positions encoded on the shaft.

Figure 6A:
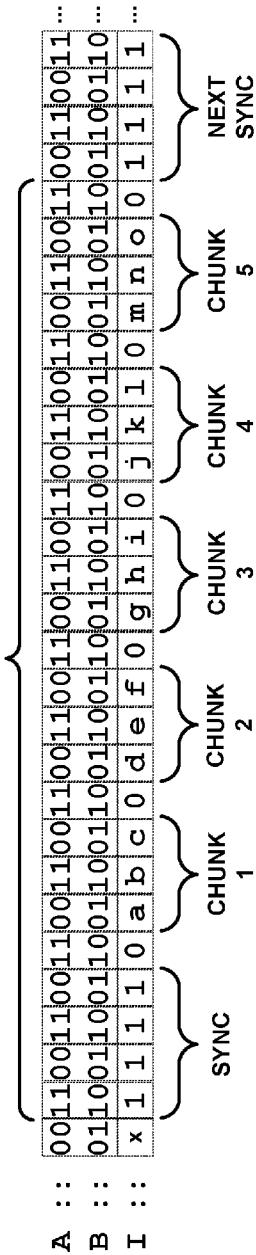
FIGS. 6A and 6B illustrate linear views of example patterns on a relative encoder disc, in accordance with the example operations.
Figure 6B:
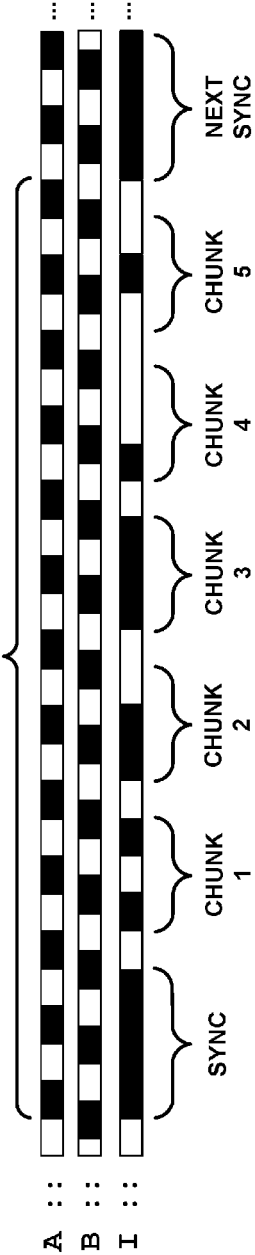

FIGS. 6A and 6B illustrate linear views of example patterns on a relative encoder disc that may help overcome at least some of the problems discussed above. These example patterns may enable a relative encoder system to quickly home, quickly determine an angular position, and quickly detect and recover from errors.

More particularly, FIGS. 6A and 6B illustrate linear views of at least a 50-tick portion of bit patterns encoded on the A/B/I tracks of a 20,000-tick disc, where the 20,000-tick disc has 25 I track bits (i.e., 50 ticks) used to encode each different angular position of the disc. Thus, the 20,000 tick disc may have 400 angular positions (i.e., 20,000/50=400) encoded on the disc, each of the 400 angular positions being readable by a relative encoder system (e.g., by photo detectors of the relative encoder system). As such, in some scenarios, the microprocessor may have to rotate the shaft no more than approximately two encoded angular positions in order to determine an angular position of the shaft. A rotation of approximately two encoded angular positions would be 1/200th of a rotation of the 20,000-tick disc, which may improve over other A/B/I relative encoder systems.

For instance, other A/B/I relative encoder systems, such as those with only an index pulse on the I track, may rotate the shaft a great distance (e.g., up to approximately 360 degrees) when homing, whereas this example relative encoder system may only have to rotate the shaft about 1.8 degrees (i.e., 360 degrees/200) when homing, compared to nearly 0 degrees for absolute encoder systems.

In other implementations, less (or more) ticks may be used to encode the different angular positions of the disc, and thus more (or less) total angular positions may be encoded on the disc.

Further, the B track may provide timing to at least some components of the relative encoder system in this example embodiment, where the relative encoder system may be configured to read the I track at a transition of the B track clock (i.e., at both the rising and falling edges of the B track clock).

Although FIGS. 6A and 6B illustrate a specific arrangement and widths of bit patterns (e.g., sync, data, padding) of an encoded absolute angular position on the I track, other arrangements and widths of bit patterns are possible as well for encoding absolute angular positions.

As shown, each angular position encoded on the I track may be defined by a 4-bit "sync" pattern, followed by five "chunks" of data bit patterns, each chunk comprising a 3-bit pattern. Further, each of the five chunks may be bracketed by 1-bit padding bit patterns. In FIG. 6A, the chunks are represented by letters abc, def, ghi, jkl, and mno, where each letter may be a bit value of either 0 or 1. Together, the five chunks of data bit patterns may comprise data for encoding one absolute angular position (e.g., the bit pattern abcdefghijklmno). In FIG. 6B, the chunks are represented by opaque and transparent portions of the disc, as the data for the one absolute angular position may actually appear on the disc of the shaft. As shown in FIG. 6B, one encoded absolute angular position, not including the sync and padding bits, may be 101110111100010 (i.e., abc=101, def=110, ghi=111, jkl=100, and mno=010).

The 4-bit sync pattern, for example, may include four 1 s in a row. In other implementations, the sync pattern may be wider or less wide than 4-bits (i.e., 8 ticks), and may include more or less 1s or other bit values.

Each of the 1-bit padding patterns may be a 0, and may be used to prevent the relative encoder system from mistaking any one of the five chunks of data with the sync pattern as well as with the other four chunks of data.

With an implementation such as this, because of repeating arrangements of different bit patterns around the disc, each arrangement corresponding to a relative angular position, the shaft can be rotated either clockwise or counterclockwise and the microprocessor can determine an absolute angular position of the shaft at any point in time. To facilitate determination of each absolute angular position, for instance, the microprocessor may count subsequent numbers that the relative encoder system reads and compare the numbers that the relative encoder system reads and decodes with a lookup table. Additionally, as noted above, the relative encoder system may use the counter to determine angular position (e.g., via offsets) and may continuously check the counter to determine whether an error has occurred.

In some homing scenarios, the relative encoder system may instruct the shaft to rotate either clockwise or counterclockwise until a sync pattern is found. Then the relative encoder system may re-home by rotating the shaft clockwise to read the number associated with that sync pattern, or by rotating the shaft counterclockwise to read a number adjacent to the number associated with that sync pattern.

In scenarios with or without detected errors, after reading one sync bit pattern, the relative encoder system may not stop reading until the system reads and decodes a number or until the system reads another sync bit pattern.

Arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A system comprising:
    a rotary encoder including three concentrically-aligned tracks, wherein a first track comprises a first repeating bit pattern, wherein a second track comprises a second repeating bit pattern that is 90 degrees out of phase with the first repeating bit pattern, wherein a third track comprises a third bit pattern of alternating sync patterns and number patterns, wherein the first track, the second track, and the third track have an identical quantity of bits, wherein the number patterns are sequentially increasing from a starting angle of the rotary encoder to an ending angle of the rotary encoder, wherein each of the sync patterns is represented by a first pre-defined quantity of sequential bits, and wherein each of the number patterns is represented by a second pre-defined quantity of sequential bits;
    a shaft coupled to the rotary encoder configured to cause the rotary encoder to rotate as the shaft rotates;
    a sensor configured to read, one bit at a time, bits of the first repeating bit pattern, the second repeating bit pattern, and the third bit pattern; and
    a controller including a processor and memory, the memory storing instructions that are executable to:
        rotate the shaft, causing the rotary encoder to rotate from a first bit position of a particular number pattern on the third track to a last bit position of a particular sync pattern that immediately follows the particular number pattern;
        as the rotary encoder rotates, read, by way of the sensor, bits of the first repeating bit pattern, the second repeating bit pattern, and the third bit pattern;
        determine an error condition in which the sensor has read more or fewer bits of the first repeating bit pattern or the second repeating bit pattern than a sum of the first pre-defined quantity and the second pre-defined quantity; and
        in response to determining the error condition, rotate the shaft, causing the rotary encoder to rotate from a first bit position of a second particular number pattern on the third track to a last bit position of a second particular sync pattern that immediately follows the particular number pattern, wherein the second particular number pattern immediately follows the particular sync pattern.

2. The system of claim 1, wherein one of the first track or the second track provides timing to the system.

3. The system of claim 1, wherein the shaft is one or more of: a shaft included in a joint of a robotic device, a drive shaft, or a motor shaft.

4. The system of claim 1, wherein the error condition is a first error condition, and wherein the instructions are further executable to:
    determine a second error condition in which, as the rotary encoder rotates between two sequential bit positions, either: (i) the sensor reads changes in bit values on both the first repeating bit pattern and the second repeating bit pattern, or (ii) the sensor reads no changes in bit values on either of the first repeating bit pattern and the second repeating bit pattern.

5. The system of claim 1, wherein the third bit pattern further includes padding bit patterns that are different from the sync patterns, wherein the padding bit patterns separate each adjacent number pattern from adjacent number patterns, and wherein the padding bit patterns separate each sync pattern from adjacent number patterns.

6. The system of claim 1, wherein the number patterns are sequentially within a sequence selected from the group consisting of a De Bruijn sequence, a gray code sequence, and a chain code sequence.

7. The system of claim 1, wherein bit values of 0 included on the first track, the second track, and the third track are represented by transparent portions of the respective track, and wherein bit values of 1 included on the first track, the second track, and the third track are represented by opaque portions of the respective track.

8. The system of claim 1, wherein the instructions are further executable to:
    as the shaft rotates and causes the rotary encoder to rotate from the first bit position of the second particular number pattern on the third track to the last bit position of the second particular sync pattern that immediately follows the particular number pattern, read, by way of the sensor, bits of the second particular number pattern; and
    decode the read bits of the second particular number pattern to determine an angle of the shaft.

9. The system of claim 8, wherein the instructions are further executable to:
    after determining the angle of the shaft, rotate the shaft, cause the rotary encoder to rotate in a particular angular direction from the last bit position of the second particular sync pattern;
    as the rotary encoder rotates in the particular angular direction from the last bit position of the second particular sync pattern, count a number of bit positions through which the rotary encoder rotates; and
    based on the particular angular direction in which the rotary encoder rotates, determine an adjusted angle of the shaft by adding or subtracting the counted number to or from the angle of the shaft.

10. A non-transitory computer readable medium having stored thereon instructions that, upon execution by a microprocessor, cause the microprocessor to perform operations comprising:

instructing a shaft to rotate, wherein the shaft is coupled to a rotary encoder configured to cause the rotary encoder to rotate as the shaft rotates, wherein the rotary encoder include three concentrically-aligned tracks, wherein a first track comprises a first repeating bit pattern, wherein a second track comprises a second repeating bit pattern that is 90 degrees out of phase with the first repeating bit pattern, wherein a third track comprises a third bit pattern of alternating sync patterns and number patterns, wherein the first track, the second track, and the third track have an identical quantity of bits, wherein the number patterns are sequentially increasing from a starting angle of the rotary encoder to an ending angle of the rotary encoder, wherein each of the sync patterns is represented by a first pre-defined quantity of sequential bits, wherein each of the number patterns is represented by a second pre-defined quantity of sequential bits, and wherein rotating the shaft causes the rotary encoder to rotate from a first bit position of a particular number pattern on the third track to a last bit position of a particular sync pattern that immediately follows the particular number pattern;

as the rotary encoder rotates, reading, by way of a sensor, bits of the first repeating bit pattern, the second repeating bit pattern, and the third bit pattern, wherein the sensor is configured to read, one bit at a time, the bits of the first repeating bit pattern, the second repeating bit pattern, and the third bit pattern;

determining an error condition in which the sensor has read more or fewer bits of the first repeating bit pattern or the second repeating bit pattern than a sum of the first pre-defined quantity and the second pre-defined quantity; and in response to determining the error condition, rotating the shaft, causing the rotary encoder to rotate from a first bit position of a second particular number pattern on the third track to a last bit position of a second particular sync pattern that immediately follows the particular number pattern, wherein the second particular number pattern immediately follows the particular sync pattern.

11. The non-transitory computer readable medium of claim 10, wherein one of the first track or the second track provides timing to the microprocessor.

12. The non-transitory computer readable medium of claim 10, wherein the shaft is one or more of: a shaft included in a joint of a robotic device, a drive shaft, or a motor shaft.

13. The non-transitory computer readable medium of claim 10, wherein the error condition is a first error condition, the operations further comprising:

determining a second error condition in which, as the rotary encoder rotates between two sequential bit positions, either: (i) the sensor reads changes in bit values on both the first repeating bit pattern and the second repeating bit pattern, or (ii) the sensor reads no changes in bit values on either of the first repeating bit pattern and the second repeating bit pattern.

14. The non-transitory computer readable medium of claim 10, wherein the third bit pattern further includes padding bit patterns that are different from the sync patterns, wherein the padding bit patterns separate each adjacent number pattern from adjacent number patterns, and wherein the padding bit patterns separate each sync pattern from adjacent number patterns.

15. The non-transitory computer readable medium of claim 10, wherein the number patterns are sequentially within a sequence selected from the group consisting of a De Bruijn sequence, a gray code sequence, and a chain code sequence.

16. The non-transitory computer readable medium of claim 10, wherein bit values of 0 included on the first track, the second track, and the third track are represented by transparent portions of the respective track, and wherein bit values of 1 included on the first track, the second track, and the third track are represented by opaque portions of the respective track.

17. The non-transitory computer readable medium of claim 10, the operations further comprising:

as the shaft rotates and causes the rotary encoder to rotate from the first bit position of the second particular number pattern on the third track to the last bit position of the second particular sync pattern that immediately follows the particular number pattern, reading, by way of the sensor, bits of the second particular number pattern; and decoding the read bits of the second particular number pattern to determine an angle of the shaft.

18. The non-transitory computer readable medium of claim 17, the operations further comprising:

after determining the angle of the shaft, rotate the shaft, causing the rotary encoder to rotate in a particular angular direction from the last bit position of the second particular sync pattern;

as the rotary encoder rotates in the particular angular direction from the last bit position of the second particular sync pattern, counting a number of bit positions through which the rotary encoder rotates; and based on the particular angular direction in which the rotary encoder rotates, determining an adjusted angle of the shaft by adding or subtracting the counted number to or from the angle of the shaft.

19. A method comprising:

rotating a shaft, wherein the shaft is coupled to a rotary encoder configured to cause the rotary encoder to rotate as the shaft rotates, wherein the rotary encoder include three concentrically-aligned tracks, wherein a first track comprises a first repeating bit pattern, wherein a second track comprises a second repeating bit pattern that is 90 degrees out of phase with the first repeating bit pattern, wherein a third track comprises a third bit pattern of alternating sync patterns and number patterns, wherein the first track, the second track, and the third track have an identical quantity of bits, wherein the number patterns are sequentially increasing from a starting angle of the rotary encoder to an ending angle of the rotary encoder, wherein each of the sync patterns is represented by a first pre-defined quantity of sequential bits, wherein each of the number patterns is represented by a second pre-defined quantity of sequential bits, and wherein rotating the shaft causes the rotary encoder to rotate from a first bit position of a particular number pattern on the third track to a last bit position of a particular sync pattern that immediately follows the particular number pattern;

as the rotary encoder rotates, reading, by way of a sensor, bits of the first repeating bit pattern, the second repeating bit pattern, and the third bit pattern, wherein the sensor is configured to read, one bit at a time, the bits of the first repeating bit pattern, the second repeating bit pattern, and the third bit pattern;

determining an error condition in which the sensor has read more or fewer bits of the first repeating bit pattern or the second repeating bit pattern than a sum of the first pre-defined quantity and the second pre-defined quantity; and in response to determining the error condition, rotating the shaft, causing the rotary encoder to rotate from a first bit position of a second particular number pattern on the third track to a last bit position of a second particular sync pattern that immediately follows the particular number pattern, wherein the second particular number pattern immediately follows the particular sync pattern.

20. The method of claim 19, wherein the shaft is one or more of: a shaft included in a joint of a robotic device, a drive shaft, or a motor shaft.

21. The method of claim 19, wherein the error condition is a first error condition, the method further comprising:

determining a second error condition in which, as the rotary encoder rotates between two sequential bit positions, either: (i) the sensor reads changes in bit values on both the first repeating bit pattern and the second repeating bit pattern, or (ii) the sensor reads no changes in bit values on either of the first repeating bit pattern and the second repeating bit pattern.

22. The method of claim 19, wherein the third bit pattern further includes padding bit patterns that are different from the sync patterns, wherein the padding bit patterns separate each adjacent number pattern from adjacent number patterns, and wherein the padding bit patterns separate each sync pattern from adjacent number patterns.

23. The method of claim 19, wherein the number patterns are sequentially within a sequence selected from the group consisting of a De Bruijn sequence, a gray code sequence, and a chain code sequence.

24. The method of claim 19, wherein bit values of 0 included on the first track, the second track, and the third track are represented by transparent portions of the respective track, and wherein bit values of 1 included on the first track, the second track, and the third track are represented by opaque portions of the respective track.

25. The method of claim 19, further comprising:

as the shaft rotates and causes the rotary encoder to rotate from the first bit position of the second particular number pattern on the third track to the last bit position of the second particular sync pattern that immediately follows the particular number pattern, reading, by way of the sensor, bits of the second particular number pattern; and decoding the read bits of the second particular number pattern to determine an angle of the shaft.

26. The method of claim 25, further comprising:

after determining the angle of the shaft, rotate the shaft, causing the rotary encoder to rotate in a particular angular direction from the last bit position of the second particular sync pattern;

as the rotary encoder rotates in the particular angular direction from the last bit position of the second particular sync pattern, counting a number of bit positions through which the rotary encoder rotates; and based on the particular angular direction in which the rotary encoder rotates, determining an adjusted angle of the shaft by adding or subtracting the counted number to or from the angle of the shaft.

* * * * *